(12) United States Patent
Kim et al.

(10) Patent No.: US 8,784,725 B2
(45) Date of Patent: Jul. 22, 2014

(54) WIDE CASTING BELT, METHOD FOR MANUFACTURING A WIDE FILM, AND WIDE FILM

(75) Inventors: Hyukjun Kim, Daejeon (KR); Kwangjin Chung, Daejeon (KR); Cholho Lee, Daejeon (KR); Yooseock Hwang, Daejeon (KR); Juntae Choi, Daejeon (KR); Kinam Chung, Daejeon (KR)

(73) Assignee: SK Innovation Co., Ltd. (KR)

( * ) Notice: Subject to any disclaimer, the term of this patent is extended or adjusted under 35 U.S.C. 154(b) by 38 days.

(21) Appl. No.: 13/375,985

(22) PCT Filed: Jun. 4, 2009

(86) PCT No.: PCT/KR2009/002966
§ 371 (c)(1),
(2), (4) Date: Jan. 23, 2012

(87) PCT Pub. No.: WO2010/140721
PCT Pub. Date: Dec. 9, 2010

(65) Prior Publication Data
US 2012/0128944 A1  May 24, 2012

(51) Int. Cl.
*B29C 39/14* (2006.01)
*B29C 39/30* (2006.01)
*B29C 39/42* (2006.01)

(52) U.S. Cl.
USPC ............ 264/555; 264/145; 264/161; 264/299

(58) Field of Classification Search
None
See application file for complete search history.

(56) References Cited

U.S. PATENT DOCUMENTS

| 6,187,250 B1 * | 2/2001 | Champagne .................. 264/495 |
| 2005/0043444 A1 * | 2/2005 | Ono et al. ..................... 523/332 |
| 2007/0108653 A1 | 5/2007 | Nakamura |
| 2008/0258335 A1 | 10/2008 | Abiru |

FOREIGN PATENT DOCUMENTS

| JP | 09-207151 | 8/1997 |
| JP | 2002-254452 | 9/2002 |
| KR | 10-2005-0027066 | 3/2005 |
| KR | 10-2008-0088522 | 10/2008 |
| KR | 10-2009-0110082 | 10/2009 |
| KR | 10-2010-0016615 | 2/2010 |

OTHER PUBLICATIONS

International Search Report—PCT/KR2009/002966 dated Feb. 10, 2010.

* cited by examiner

*Primary Examiner* — Monica Huson
(74) *Attorney, Agent, or Firm* — Cantor Colburn LLP

(57) ABSTRACT

The present invention relates to a wide casting belt, and more particularly, to a wide casting belt used for manufacturing a film in a gel state by casting dope used during the manufacture of a polarizing plate for a liquid crystal display, and an optical compensation film, etc. The present invention also relates to a method for manufacturing a wide film using the wide casting belt, and to a wide film manufactured with said wide casting belt.

3 Claims, 11 Drawing Sheets

WIDE CASTING BELT, METHOD FOR MANUFACTURING A WIDE FILM, AND WIDE FILM

FIELD OF INVENTION

The present invention relates to a wide casting belt, and more particularly, to a wide (width) casting belt used for manufacturing a gel type film by casting a dope in manufacturing a film used for a polarizer of a liquid crystal display or an optical compensation film.

The present invention also relates to a method for manufacturing a wide film using the wide casting belt described above and a wide film manufactured using the wide casting belt described above.

BACKGROUND OF THE ART

A cellulose acylate film has high transparency and a mechanical strength, and favorable dimensional stability with minimal dependency on humidity and temperature. Accordingly, this film is broadly used as a support for optical materials requiring such characteristics as described above. In general, the cellulose acylate film is manufactured by casting a dope containing a polymer dissolved in a solvent, over a non-discontinuous (that is, 'continuous') support.

A casting method may be classified into two types that include a belt casting and a drum casting in respect of the kinds of continuous supports. The belt casting is a method wherein a dope is casted on a belt, a some amount of solvent is dried and stripped off (detached) and a film is transported to a post-stage process, while the drum casting is a method wherein a dope is casted over a drum and stripped off with substantially little drying, and a film is transported to a post-stage process.

The belt casting generally controls dry conditions and is useful for manufacturing a variety of films, while the drum casting may attain high speed casting, thus enabling mass production. Both the foregoing methods have a disadvantage in that the continuous support, that is, the belt and the drum must be minutely surface-processed to produce a film having the clean surface required for a liquid display.

In order to minutely process the surface of the continuous support, both the belt and the drum must undergo surface abrasion with high precision. For the belt, a belt made of stainless steel is fabricated through grinding and abrasion. The drum is fabricated by nickel plating and hard chromium plating a carbon steel drum then abrasion thereof.

Although the drum does not involve problems, the belt must have a joint 11 formed to link both ends of the belt, thus forming a continuous support as shown in FIG. 1. Joint formation may be accomplished through welding and, in general, the welding method includes tig welding, laser welding, etc. The welding may be conducted before or after abrasion. Since a welded part may remain on the belt after welding, the welded part should be clearly abraded even without encountering problems during film formation. However, the welded part cannot be completely removed, instead, is visibly distinguishable. Accordingly, when a polarizer or an optical compensation film is manufactured using the prepared cellulose acylate, some products may be used after cutting out a welding line therefrom.

In recent years, as a liquid crystal display tends to be increased in a size, widths of a polarizer and an optical compensation film are increased in response to the increase in size described above. Accordingly, in order to the tendency of an increase in width and to allow increase of product yield in manufacturing polarizer and optical compensation films, there are needs for development of an improved cellulose acylate film and for widening thereof.

The drum may be fabricated into a drum having a width of 2030 mm or more, in turn enabling production of a wide film. On the other hand, it is known that the belt production is limited to realize a belt having a maximum width of 2030 mm. Therefore, referring to FIG. 2, in order to fabricate a belt having a width of 2030 mm or more, two different belts may be welded in a length direction. Meanwhile, since a central joint Cc formed through welding between a first belt 10 and a second belt 20, the prepared film has a mark caused by the central joint Cc, in turn encountering difficulty in the use thereof.

The casted dope on the belt is stripped off and formed into a film by a tenter and a drier. The film is slightly shrunk in a width direction after casting to a stripping operation, and optionally subjected to stretching in the tenter. In a drying process using the drier, the film does not show high numerical variation. In order to smoothly transport a normal film and maintain overall characteristics of the film, a trimming process of cutting both ends of the film is adopted wherein the casting process is conducted at one or two sites after casting, tenter processing, drying, etc.

Accordingly, considering a belt with a width of 2030 mm, a width of a film to be manufactured is 2.03 m or less. Further, in consideration of stability in practical casting, stretching at the tenter and removal of both ends of the film, a maximum width possibly obtained may be 1800 mm or less, thus entailing difficulty in manufacturing a film to be in accordance with the current widening trend.

SUMMARY

Technical Problem

An object of the present invention is to provide a wide casting belt capable of providing a wide film without having a welding seam mark part in the central part due to belt welding in manufacturing a film by belt casting.

Another object of the present invention is to provide a method for manufacturing a wide film using a wide casting belt without having a mark part in the central part due to belt welding.

A still another object of the present invention is to provide a wide film manufactured using a wide casting belt without having a mark part in the central part due to belt welding.

Technical Solution

In one general aspect, a wide casting belt to cast a polymer solution in order to form a gel type film includes: a central belt; a left belt having a right end connected to a left end of the central belt in a length direction of the central belt, to form a left joint between the central belt and the left belt; and a right belt having a left end connected to a right end of the central belt in the length direction of the central belt, to form a right joint between the central belt and the right belt.

The central belt joint connecting the central belt, the left belt joint connecting the left belt and the right belt joint connecting the right belt may be arranged in the same straight line. A width of the left belt and a width of the right belt may range from 300 to 700 mm, respectively. The central belt joint, the left belt joint and the right belt joint may be formed, respectively, at an angle of 0° to 25° to a transverse face of the wide casting belt. Further, the left joint, the right joint, as well as the central belt joint, the left belt joint and the right belt joint, may be formed through welding.

In another general aspect, a method for manufacturing a wide film using the wide casting belt described above includes: casting a dope containing a cellulose triacetate solution on the wide casting belt described above, to form a gel type film; stretching the gel type film stripped off from the wide casting belt, using a tenter; a first trimming process of removing a mark part caused by gripping left and right parts of the stretched film using the tenter during stretching; drying the film obtained from the first trimming process, using a dryer; a second trimming process of removing some parts at left and right side of the film after the drying process; marking the trimmed parts at the left and right sides of the film after the second trimming process; and winding the marked film.

The dope may include a solvent such as methylene chloride or methanol and a plasticizer, other than the cellulose triacetate, have a solid content comprising the cellulose triacetate and the plasticizer of 15 to 25 wt. %, and a mixing ratio of the solvents, that is, methylene chloride and methanol may range from 80 to 95 wt. % and 5 to 20 wt. %, respectively, while the plasticizer may be contained in an amount of 5 to 20 wt. %, relative to 100 wt. % of the cellulose triacetate. If the gel type film stripped off from the wide casting belt has a width of CW and the film obtained from the stretching process has a width of TW, the film has CW≥1300 mm; and CW×0.9≤TW≤CW×1.3.

In still another general aspect, a wide film manufactured using the wide casting belt described above is provided.

A width of a part formed between the left joint and the right joint through casting may be 1500 mm or more. Also, if an intrafacial retardation is $R_e$ and a facial retardation is $R_{th}$, the wide film may have $0 \leq R_e \leq 5$ nm; and $0 \leq R_{th} \leq 100$ nm. The wide film may have a thickness of 40 to 80 µm. The wide film may further include a mark part formed from the left and right joints. Further, Anti-slipping mark parts are formed between the left end of the film and the mark part formed by the left joint, and between the right end of the film and the mark part formed by the right joint, respectively, in order to prevent damage of the film due to film slip during winding Advantageous Effects According to the present invention, a wide film having a width of 1500 mm or more may be advantageously manufactured without having a mark part caused by belt welding at the central part.

In addition, the present invention may attain advantages in that requirements of a film regarding intrafacial retardation, facial retardation and film thickness can be satisfied even without increasing a stretching rate of the film during stretching, and a film having a desired width may be easily manufactured.

| [Detailed Description of Main Elements] | |
|---|---|
| 100: wide casting belt | 110: central belt |
| 120: left belt | 130: right belt |
| 111: central belt joint | 121: left belt joint |
| 131: right belt joint | |
| Wc: width of central belt | Wl: width of left belt |
| Wr: width of right belt | |
| Cl: left joint | Cr: right joint |
| 100T: caster | 200: stripping roller |
| 300: tenter | 400: first trimmer |
| 500: dryer | 600: second trimmer |
| 700: marking press | 800: winding roller |

DETAILED DESCRIPTION OF EMBODIMENTS

Embodiments of the present invention will be described in more detail by the following examples with reference to accompanying drawings.

EXAMPLE 1

Example 1 relates to a wide casting belt according to the present invention.

Figure 3:
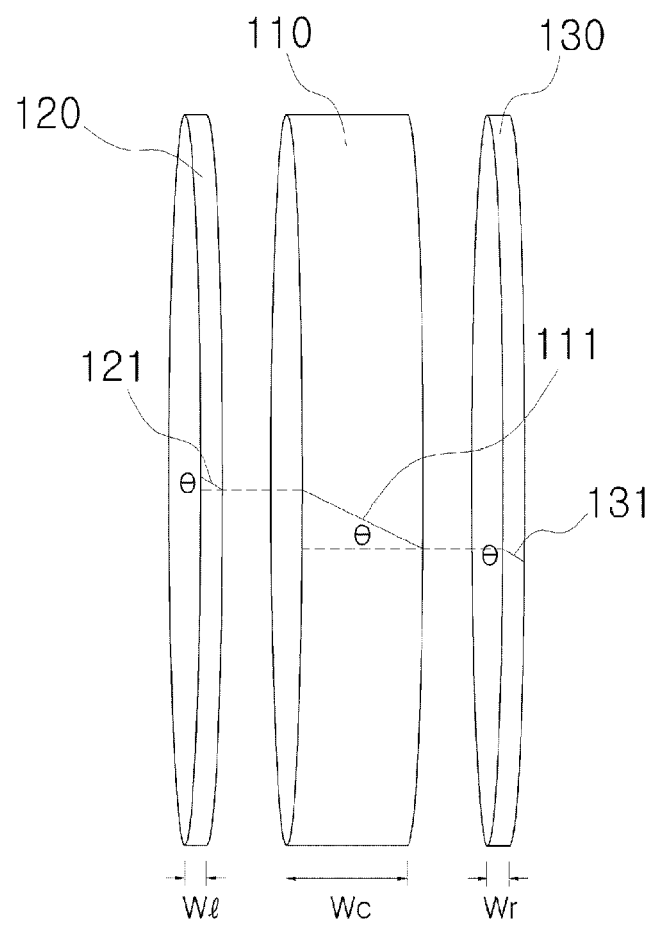
FIG. 3 is a perspective view showing Example 1.
Figure 4:
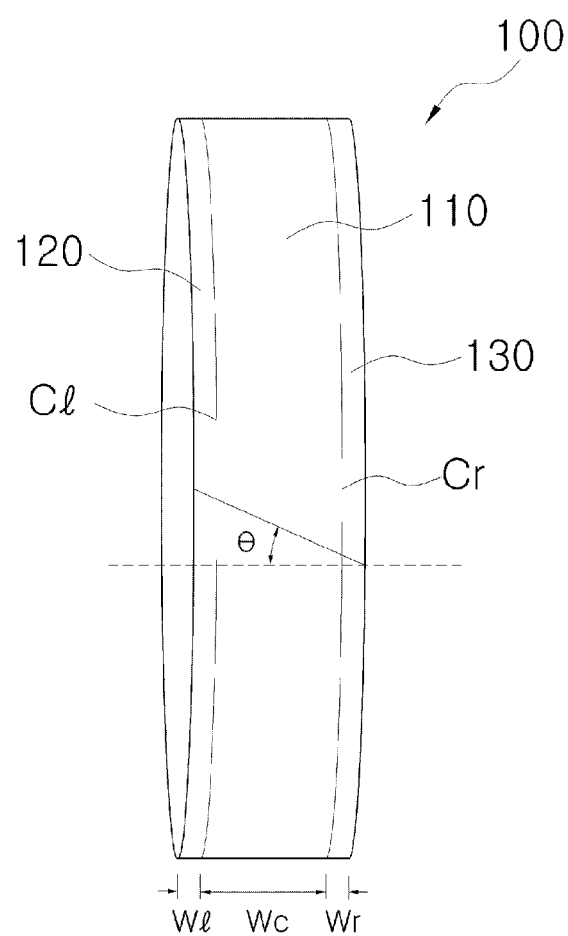
FIG. 4 is an exploded perspective view showing Example 1.

FIG. 3 is a perspective view of Example 1 and FIG. 4 is an exploded perspective view of Example 1.

As described in the following Example 2, in order to form a film using a polymer solution, operations including: casting a dope containing the polymer solution on a belt; stripping a gel type film formed in the casting operation; stretching the stripped film through a tenter; drying the stretched film; and winding the dried film, may be conducted.

Example 1 relates to a wide casting belt used for casting, that is, a wide casting belt that casts a dope containing a polymer solution to form a belt used for casting, that is, a gel type film.

Referring to FIGS. 3 and 4, the wide casting belt 100 in Example 1 has a central belt 110, a left belt 120 and a right belt 130.

Referring to FIGS. 3 and 4, the central belt 110 has a central belt joint 111, wherein the central belt joint 111 is a transverse joint connecting upper and lower ends of the central belt 110, to form a continuous belt. The central belt joint 111 may be formed by welding and, here, the welding may be tig welding or laser welding. In the casting operation, the central belt joint 111 is located in the middle region of a film to be completed as a final product, thus requiring high quality surface abrasion to prevent marks from remaining due to the joint.

Referring to FIGS. 3 and 4, the left belt 120 and the right belt 130 have respectively a left belt joint 121 and a right belt joint 131. Each of the left belt joint 121 and the right belt joint 131 may be a transverse joint similar to the central belt joint 111. However, unlike the central belt joint 111, both the left belt joint 121 and the right belt joint 131 need not have high quality surface abrasion. Surface abrasion may be conducted, sufficient enough that a film does not tear at the left belt joint 121 and/or the right belt joint 131 in manufacturing the film or operation failure does not occur.

Referring to FIG. 4, an angle of the central belt joint 111 to a transverse face of the central belt 110, an angle of the left belt joint 121 to a transverse face of the left belt 120, and an angle of the right belt joint 131 to a transverse face of the right belt 130 may be substantially identical to one another and indicated as θ, wherein θ may range from 0° to 25°.

Referring to FIGS. 3 and 4, a width Wc of the central belt 110 may be 2030 mm, which is known to be the maximum belt width in the related art, while widths Wl and Wr of the left belt 120 and the right belt 130, respectively, may range from 300 to 700 mm.

Referring to FIGS. 3 and 4, the left belt 120 is connected and is integrated with the central belt 110 while forming a left joint Cl between a right end of the left belt 120 and a left end of the central belt 110 in a length direction. That is, the left belt 120 is connected and integrated with the central belt 110 while forming the left joint Cl between the left belt 120 and the central belt 110.

Similarly, the right belt 130 is connected and integrated with the central belt 110 while forming a right joint Cr between a left end of the right belt 130 and a right end of the central belt 110 in a length direction. That is, the right belt 130 is connected and integrated with the central belt 110 while forming the right joint Cr between the right belt 130 and the central belt 110.

Referring to FIG. 3, the left belt 120 and the right belt 130 are connected to the central belt 110, resulting in a wide casting belt 100.

Meanwhile, the left joint Cl and the right joint Cr may be formed by welding, wherein the welding may include tig welding, laser welding, etc. The left joint Cl and The right joint Cr need not have high quality surface abrasion, contrary to the central belt joint 111. Instead, surface abrasion may be conducted, sufficient enough that a film does not tear at the left joint Cl and/or the right joint Cr in manufacturing the film or operation failure does not occur.

Referring to FIG. 3, the central belt joint 111, the left belt joint 121, and the right belt joint 131 may be provided on the same straight line. Also, the central belt joint 111, the left belt joint 121, and the right belt joint 131 may be formed by welding only one time after the left joint Cl and the right joint Cr are formed.

EXAMPLE 2

Example 2 relates to a method for manufacturing a wide film using the wide casting film described in Example 1.

Figure 5:
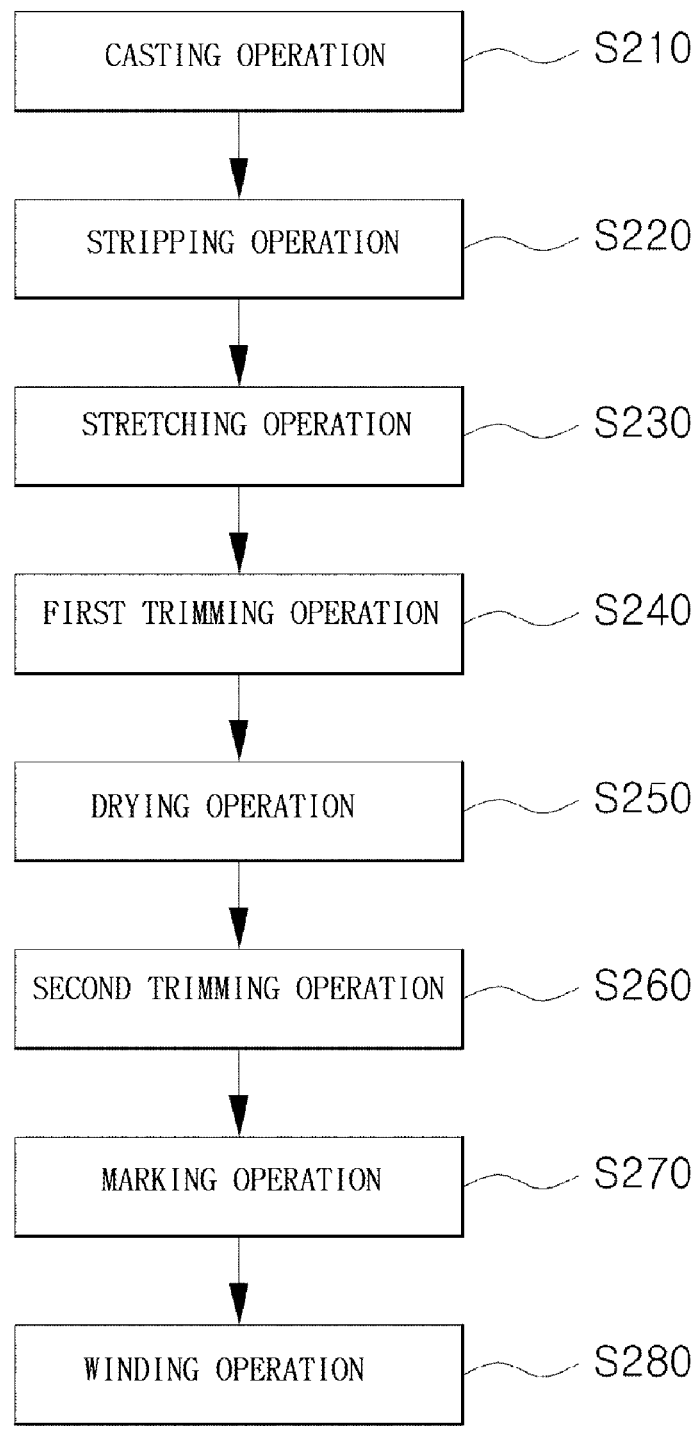
FIG. 5 illustrates a flow diagram of Example 2.
Figure 6:
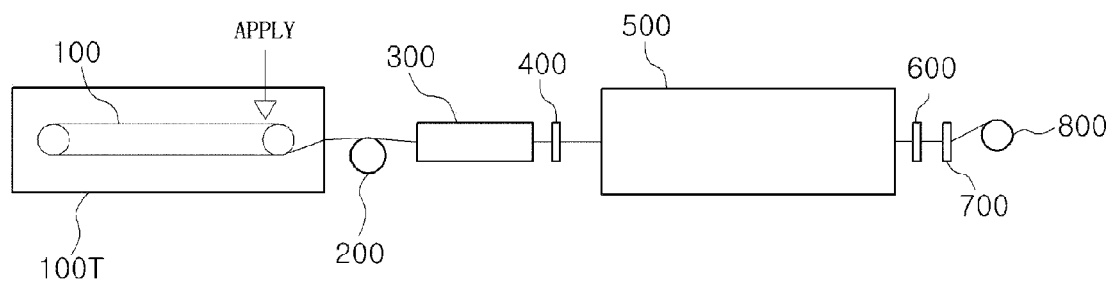
FIG. 6 is a schematic block diagram showing an apparatus for implementation of Example 2.
Figure 7:
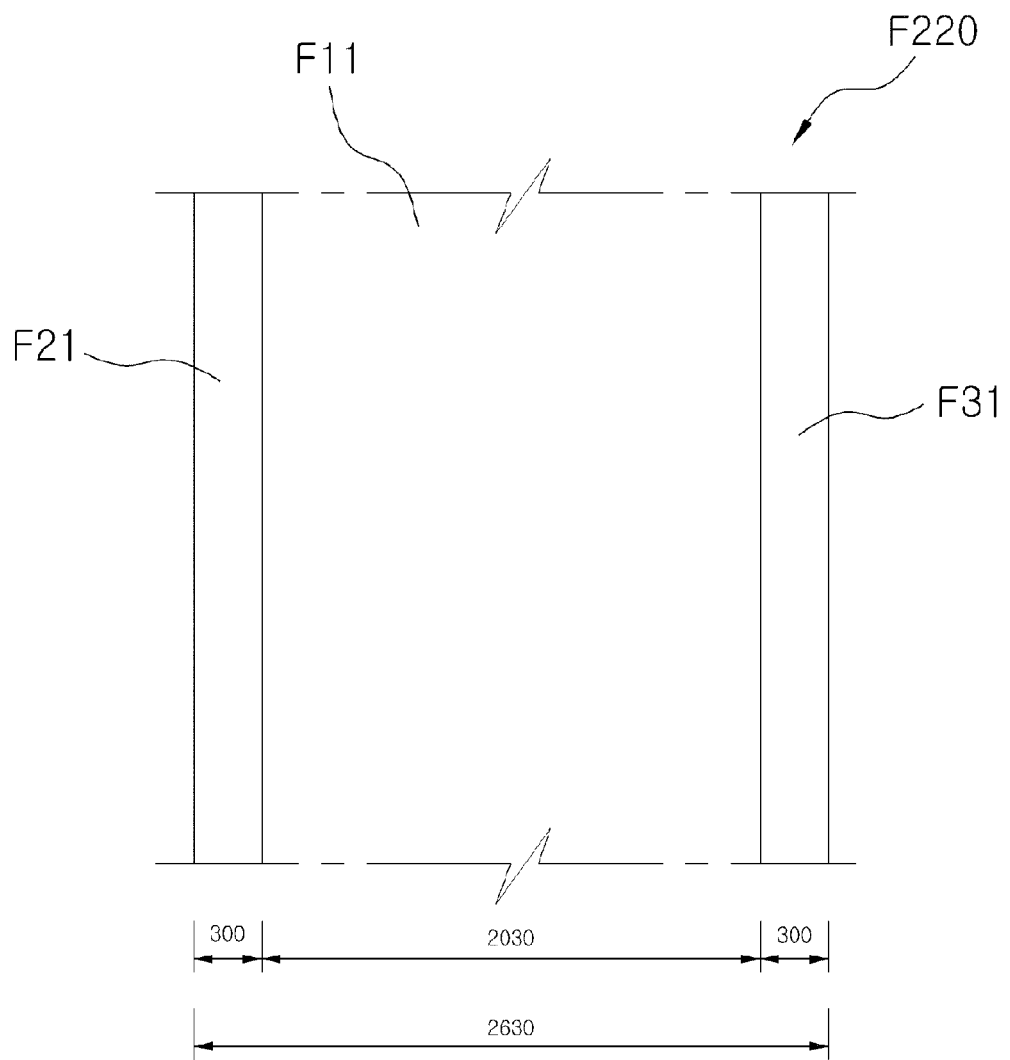
FIG. 7 is a schematic view showing the film obtained from the stripping operation shown in FIG. 6.
Figure 8:
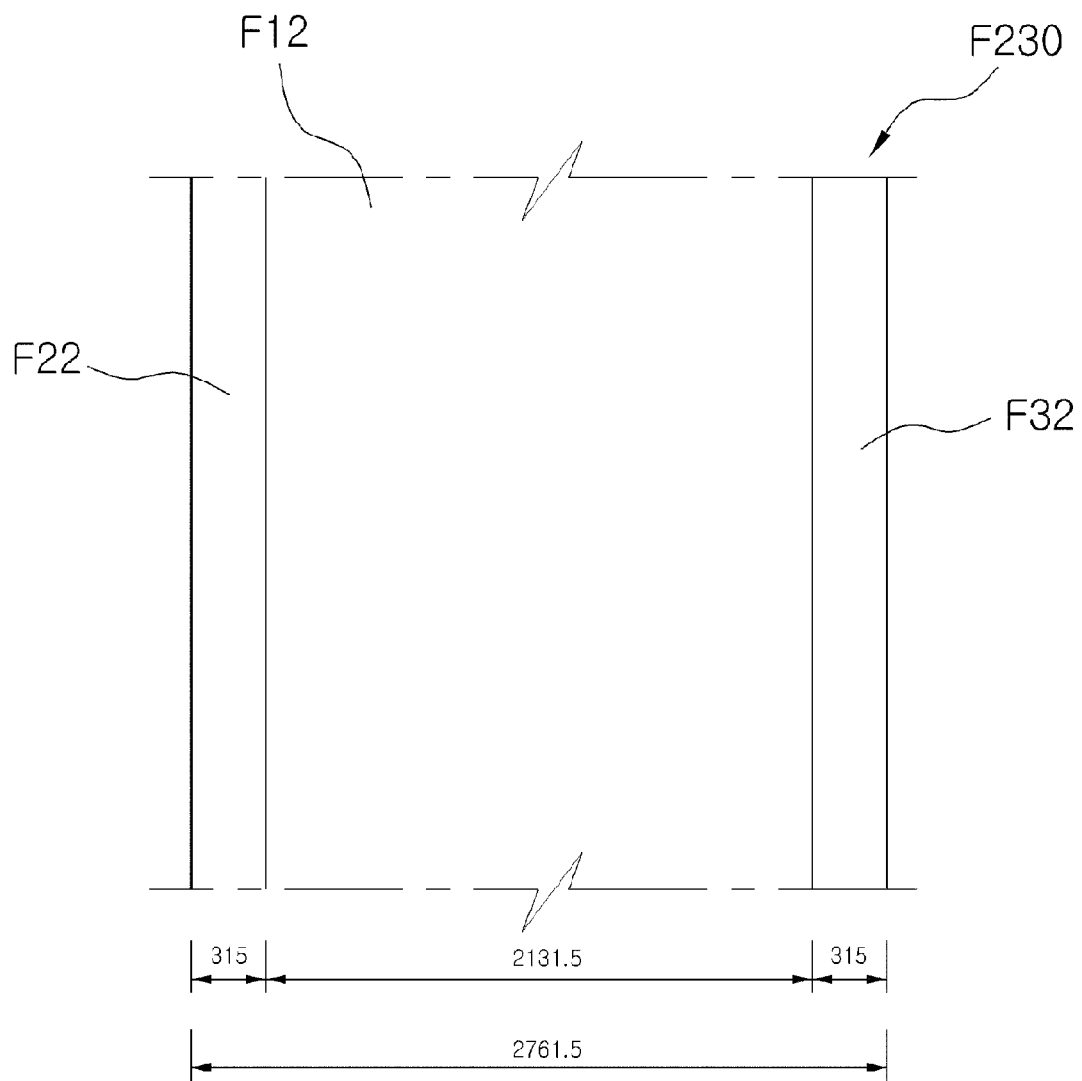
FIG. 8 is a schematic view showing the film obtained from the stretching operation shown in FIG. 6.
Figure 9:
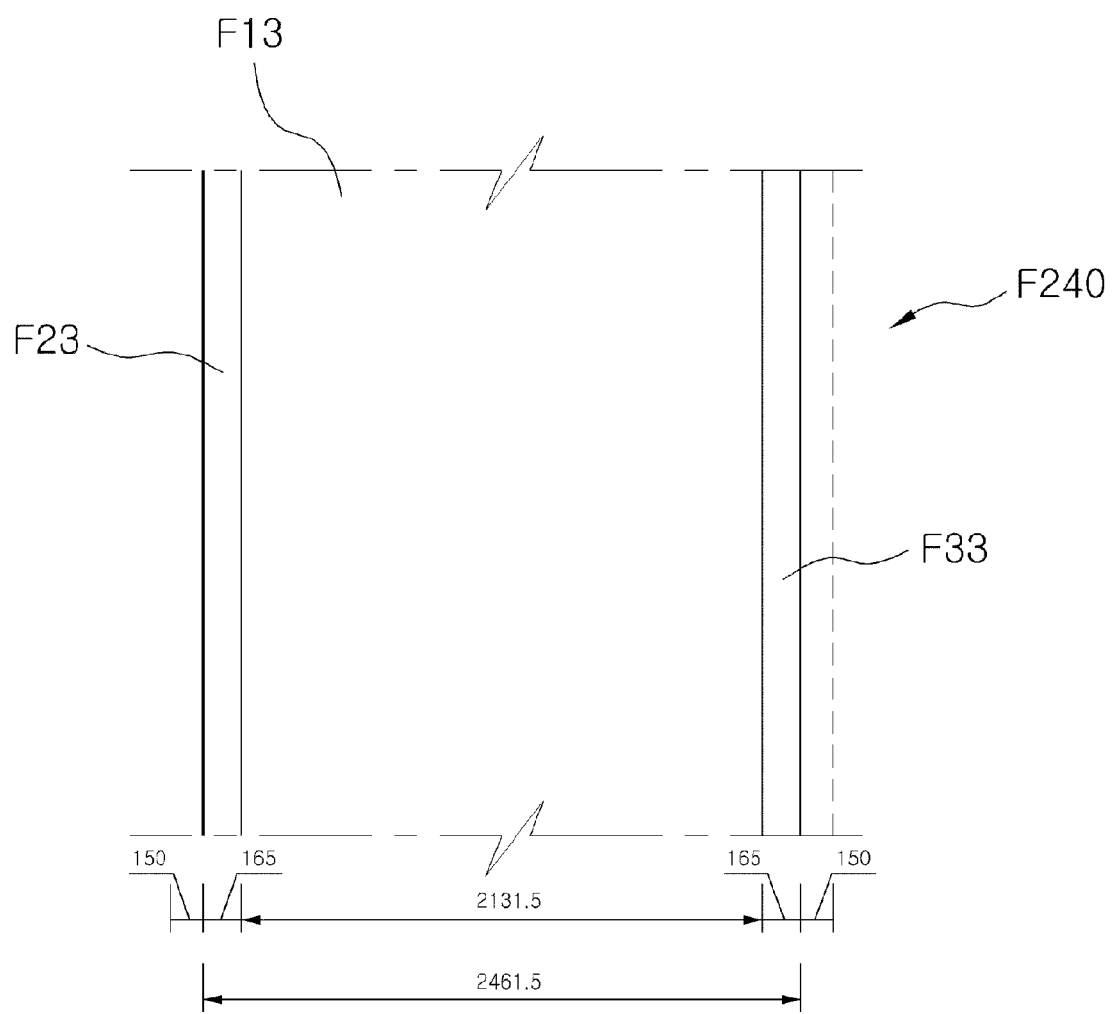
FIG. 9 is a schematic view showing the film obtained from the first trimming operation shown in FIG. 6.
Figure 10:
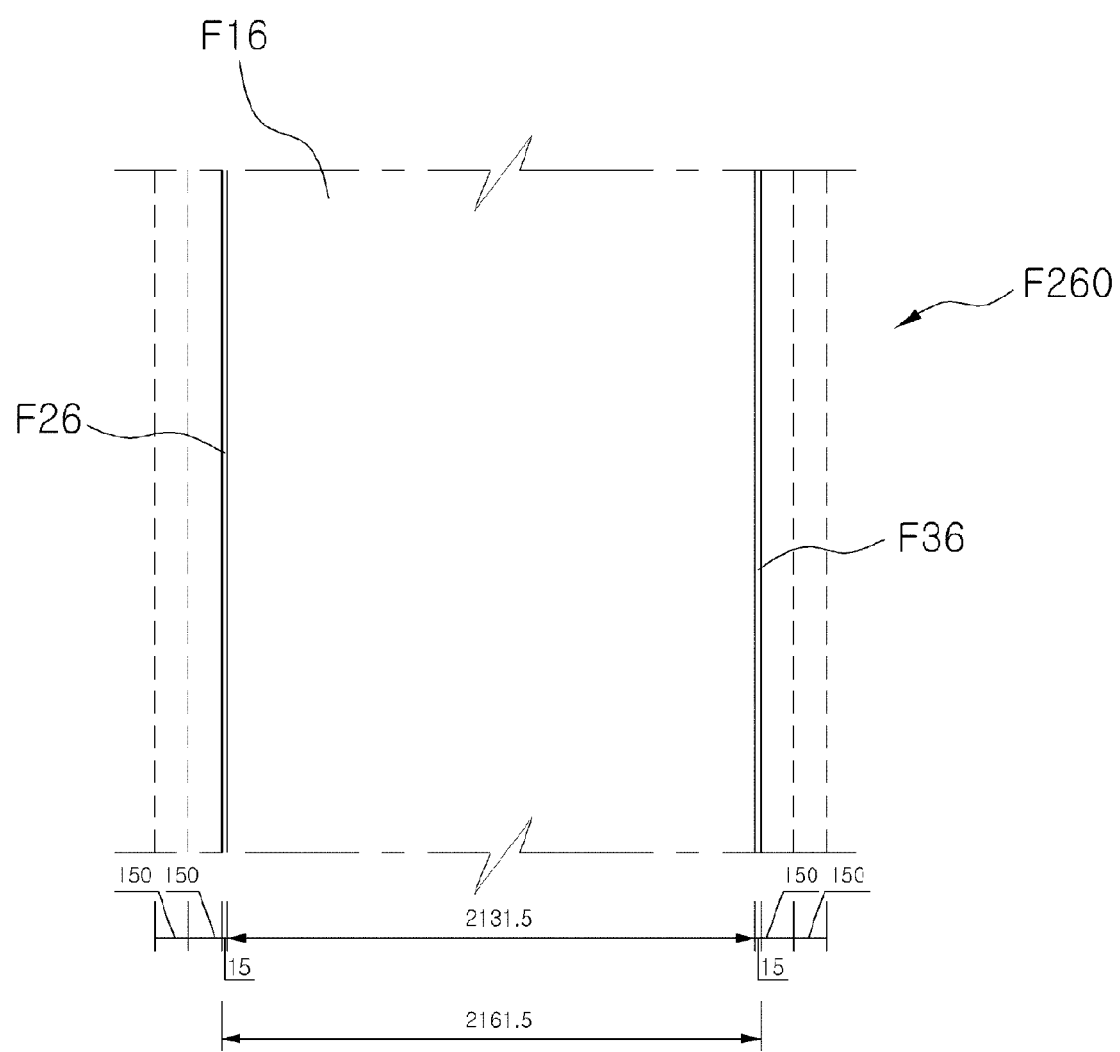
FIG. 10 is a schematic view showing the film obtained from the second trimming operation shown in FIG. 6.
Figure 11:
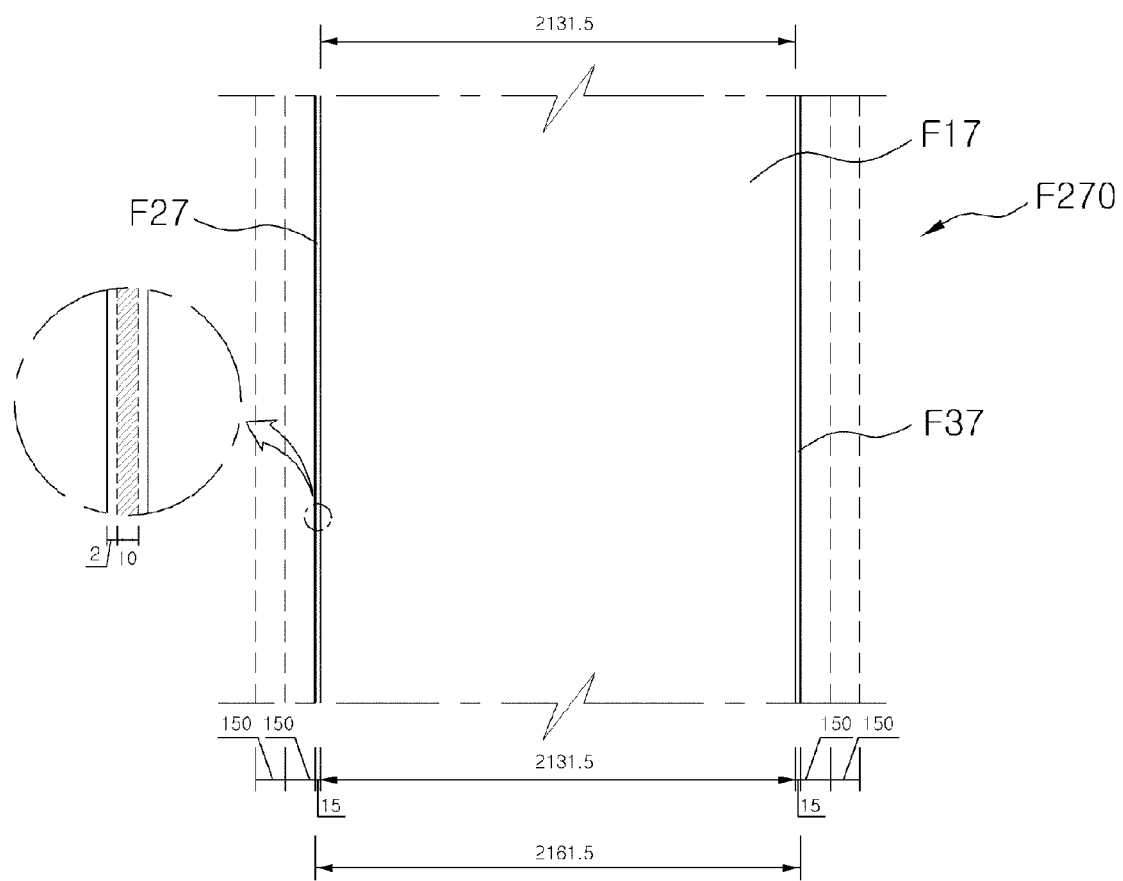
FIG. 11 is a schematic view showing the film obtained from the marking operation shown in FIG. 6.

FIG. 5 is a flow diagram of Example 2, FIG. 6 is a schematic block diagram showing an apparatus for implementation of Example 2; FIG. 7 is a schematic view showing the film obtained from the stripping operation shown in FIG. 6; FIG. 8 is a schematic view showing the film obtained from the stretching operation shown in FIG. 6; FIG. 9 is a schematic view showing the film obtained from the first trimming operation shown in FIG. 6; FIG. 10 is a schematic view showing the film obtained from the second trimming operation shown in FIG. 6; and FIG. 11 is a schematic view showing the film obtained from the marking operation shown in FIG. 6.

Referring to FIG. 5, Example 2 includes a casting operation S210, a stripping operation S220, a stretching operation S230, a first trimming operation S240, a drying operation S250, a second trimming operation S260, a marking operation S270 and a winding operation S280.

Referring to FIGS. 5 and 6, the casting operation S210 produces a gel type film using a caster 100T. The caster 100T includes a belt on which a dope containing a polymer solution is cast, wherein the belt is substantially the wide casting belt 100 in Example 1. The dope may have solid content comprising of cellulose triacetate and a plasticizer ranging from 15 to 25 wt. %, while a solvent is a mixed solution of methylene chloride and methanol. A mixing ratio of methylene chloride and methanol may range from 80:20 to 95:5, in a ratio by weight. Additionally, 5 to 20 wt. % of plasticizer, 0.5 to 2 wt. % of UV protector, 0.1 to 1 wt. % of anti-blocking agent, $0.1 \times 10^{-4}$ to $100 \times 10^{-4}$ wt. % of dye, etc., may be included in relation to 100 wt. % of cellulose triacetate. Referring to FIG. 3, in the wide casting belt 100, a width Wc of the central belt 110 is 2030 mm, a width Wl of the left belt 120 is 400 mm, and a width Wr of the right belt 130 is 400 mm. When the wide casting belt 100 is rotated by a rotator (no reference numeral is assigned in the figure), the solvent contained in the dope having cast on the wide casting belt 100 is evaporated, thus resulting in a gel type film. Meanwhile, in the casting operation S210, the dope undergoes casting to render the film acquired by the stripping operation S220 to have a width of 2630 mm.

Referring to FIGS. 5 and 6, the gel type film formed in the casting operation S210 is stripped off from the wide casting belt 100 by a stripping roller 200 in the stripping operation S220. A solvent residue during stripping is controlled in the range of 20 to 40 wt. %. Referring to FIG. 7, the film F220 acquired in the stripping operation S220 comprises a central part F11 stripped off from the central belt 110, a left part F21 stripped off from the left belt 120 and a right part F31 stripped off from the right belt 130. A width of the central part F11 is 2030 mm and widths of the left part F21 and the right part F31 are 300 mm, respectively, thereby resulting in a total width of 2630 mm.

Referring to FIGS. 5 and 6, the stretching operation S230 uses a tenter 300 to stretch the film F220 obtained from the stripping operation S220. In the stretching operation S230, left and right sides of the film F220 are gripped by a tenter pin (no reference numeral is assigned in the figure) or a tenter clip (no reference numeral is assigned in the figure) and a length thereof in a width direction extends 5%, compared to before the stretching. The stretching operation may also involve a drying process. Referring to FIG. 8, a width of the central part F12 in the film F230 obtained from the stretching operation S230 is 2131.5 mm while width of the left part F22 and the right part F32 are 315 mm, respectively, thus resulting in a total width of 2761.5 mm.

Referring to FIGS. 5 and 6, the first trimming operation S240 uses a first trimmer 400 to cut predetermined parts of the left and right sides of the film F230 obtained from the stretching operation S230. Referring to FIGS. 8 and 9, an area removed in the first trimming operation S240 includes parts of about 150 mm, respectively, apart from both ends of the left part F22 and the right part F32 in the film F230 acquired in the stretching operation S230. The area removed in the first trimming operation S240 also includes a part, which is present in each of the left part F22 and the right part F32 of the film F230 acquired in the stretching operation S230 and gripped and marked by the tenter 300 during stretching. Referring to FIG. 9, a width of the central part F13 of the film F240 obtained from the first trimming operation S240 is 2131.5 mm while widths of the left part F23 and the right part F33 are 165 mm, respectively, thus resulting in a total width of 2461.5 mm.

Referring to FIGS. 5 and 6, the drying operation S250 is conducted to dry the film obtained from the first trimming operation S240 using a dryer 500. The drying operation S250 may use any dryer generally used in the related art.

Referring to FIGS. 5 and 6, the second trimming operation S260 uses a second trimmer 600 to cut determined parts of the left and right sides of the film (no reference numeral is assigned in the figure) acquired in the drying operation S250. Referring to FIG. 10, an area removed in the second trimming operation S260 includes parts of about 150 mm, respectively, apart from both ends of the left part and the right part in the film (no reference numeral is assigned in the figure) acquired in the drying operation S250. The second trimming operation S260 may be conducted to smoothly transport the film and maintain overall characteristics of the film. Referring to FIG. 10, a width of the central part F16 of the film F260 obtained from the second trimming operation S260 is 2131.5 mm while widths of the left part F26 and the right part F36 are 15 mm, respectively, thus resulting in a total width of 2161.5 mm.

Referring to FIGS. 5 and 6, the marking operation S270 may be conducted to mark determined sites of the left part F26 and right part F36 of the film 260 obtained from the second trimming operation S260. The marking process may be implemented by any typical method using a marking press 700 in the related art. FIG. 11 illustrates the film F270 obtained from the marking operation S270. Referring to FIG. 11, a part to be marked may be present in a region between a point impressed 2 mm from the left end to a point impressed 12 mm from the same in a width direction, as well as a region between a point impressed about 2 mm from the right end to a point impressed 12 mm from the same in a width direction. That is, the marking is given to the left part F27 and the right part F37, respectively. The marking operation S270 may prevent the film from being damaged by film slip while winding the film, prevent a black belt from being generated after film winding, and enable the film to be wound in large quantities while winding.

Referring to FIGS. 5 and 6, the winding operation S280 may wind the film F260 obtained from the marking operation S270 around a winding roller 800.

Accordingly, referring to FIG. 11, the film in Example 2 may have a central part F17 with a width of 2131.5 mm present between marked parts formed by the left joint Cl and the right joint Cr, as well as left and right parts F27 and F37 having a width of 15 mm marked, respectively, in the marking operation S270.

COMPARATIVE EXAMPLE 1

Figure 1:
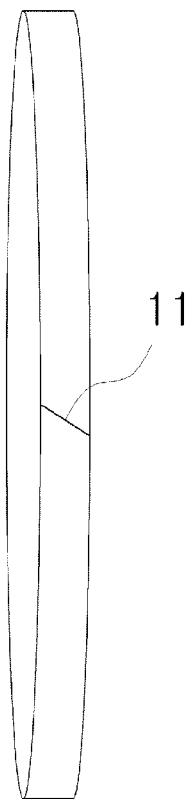
FIGS. 1 and 2 are perspective views showing a casting belt in the related art.

To a continuous support belt having a width of 2030 mm formed as shown in FIG. 1, a dope was casted to a width of 1830 mm and then was stripped off. A solvent residue during stripping was controlled in the range of 20 to 40 wt. %. After connecting the belt to a tenter, the film was stretched 5% in a width direction of the film and, after outputting the film from the tenter, each of left and right ends of the film was cut by 150 mm. The end-cut film was dried using a dryer and the left and right ends of the dried film were cut again by 150 mm, respectively. After then, marking was conducted at an area of 12 mm from an inner side of 2 mm from each film end, that is, a distance of about 10 mm, followed by winding, thereby resulting in a final film having a width of 1321.5 mm.

COMPARATIVE EXAMPLE 2

Figure 2:
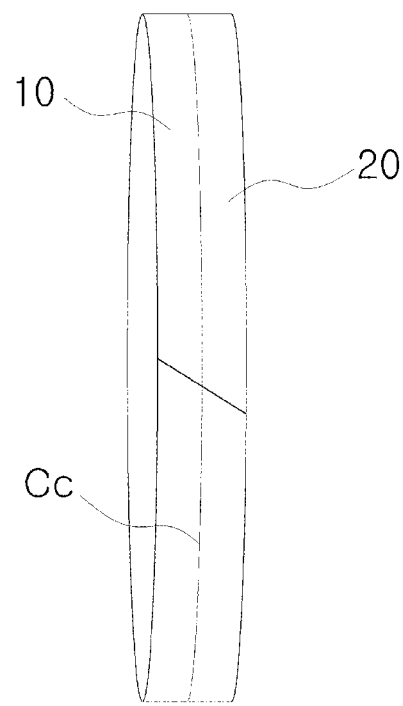

To a region between a first belt 10 and a second belt 20 shown in FIG. 2, a dope was casted using a wide casting belt having a central joint Cc by welding, and then, stripped off. The first belt 10 and the second belt 20, respectively, were a continuous support belt having a width of 2030 mm. The dope was casted on the wide casting belt to a width of 3860 mm, and then, stripped off. A solvent residue during stripping was controlled in the range of 20 to 40 wt. %. After connecting the belt to a tenter, the film was stretched 5% in a width direction of the film and, after outputting the film from the tenter, each of the left and right ends of the film was cut by 150 mm. The end-cut film was dried using a dryer and the left and right ends of the dried film were cut again by 150 mm, respectively. Then, marking was conducted at an area of 12 mm from an inner side by 2 mm from each film end, that is, a distance of about 10 mm, followed by winding, thereby resulting in a final film having a width of 3453 mm.

According to Comparative Example 1, a film having an overall width of 1321.5 mm including the marked part may be obtained.

A film resulted from Comparative Example 2 is a wide film having a width of 3453 mm, wherein a part marked by the joint Cc is included at the center of the film. In the case where the film is cut in a length direction around the part marked by the joint Cc, the film may have a width of 1726.5 mm.

On the other hand, the wide film in Example 2 may have a central part F17 having a width of 2131.5 mm present between marked parts formed by the left joint Cl and the right joint Cr. That is, Example 2 may provide a film having a larger width than the maximum width of a film obtainable from Comparative Example 2, wherein a marked part is not included in the center thereof, even when a total width of the wide casting belt 100 is smaller than a belt width described in Comparative Example 2.

In Example 1, the gel type film stripped off from the wide casting belt 100 has a width of 2030 mm at the central part F11 thereof while the left part F21 and the right part F31 of the film have a width 300 mm, respectively, thus having the total width of 2630 mm. On the other hand, for the film F230 obtained from the stretching operation S230, the central part F12 has a width of 2131.5 mm while the left part F22 and the right part F32 have a width of 315 mm, respectively, thus having the total weight of 2761.5 mm. However, the present invention is not particularly limited to the foregoing. For instance, according to other embodiments, in the case where a width of the gel type film stripped off from the wide casting belt 100 is CW and a width of the film resulted from the stretching operation is TW, the film may have CW≥1300 mm and CW×0.9≤TW≤CW×1.3.

EXAMPLE 3

Example 3 relates to a wide film manufactured using the wide casting belt described in Example 1. Although Example 3 (the wide film) may be manufactured by the method according to Example 2, it is not necessary to manufacture Example 3 (the wide film) according to the method of Example 2.

As described above, Example 3 regards to a wide film manufactured using the wide casting belt in Example 1, and the wide film of Example 3 may include a part having a width of 1500 mm or more formed between the left joint Cl and the right joint Cr through casting.

Since Example 3 provides the wide film manufactured using the wide casting belt described in Example 1, the marked parts formed by the left joint Cl and the right joint Cr may be included. In addition, in order to prevent damage due to a film slip while winding, anti-slipping mark parts may be further formed between the left end of the film and the marked part formed by the left joint Cl, and between the right end of the film and the marked part formed by the right joint Cc, respectively.

If an intrafacial retardation is $R_e$ and a facial retardation is $R_{th}$, the wide film in Example 3 may have $R_e \leq 5$ nm and $0 \leq R_{th} \leq 100$ nm. Although it is occasionally difficult to control the intrafacial retardation $R_e$ and the facial retardation $R_{th}$ where a stretching rate is increased to increase the width of the final film, Example 3 can enable manufacturing of a film having a desired width even if the stretching rate is decreased, thereby easily controlling both the intrafacial retardation $R_e$ and the facial retardation $R_{th}$.

Further, the wide film obtained in Example 3 may have a thickness ranging from 40 to 80 μm.

What is claimed is:

1. A method for manufacturing a wide film using a wide casting belt, comprising:

casting a dope containing a cellulose triacetate solution on the wide casting belt to form a gel type film, the wide casting belt being formed of a central belt having a central belt joint, a left belt having a left belt joint and a right belt having a right belt joint, wherein the central belt joint, the left belt joint and the right belt joint are formed, respectively, at an angle of 0° to 25° to a transverse face of the wide casting belt;

stretching the gel type film stripped off from the wide casting belt, using a tenter;

a first trimming process of removing a mark part caused by gripping left and right parts of the stretched film using the tenter during stretching;

drying the film obtained from the first trimming process, using a dryer;

a second trimming process of removing some parts at left and right sides of the film to smoothly transport the film and maintain overall characteristics of the film, after the drying process;

marking anti-slipping mark on the left and right sides of the trimmed parts to prevent the film from being damaged while winding the film, enable the film to be wound in large quantities while winding, and prevent generation of a black belt after film winding, after the second trimming process; and winding the marked film.

2. The method of claim 1, wherein the dope has a solid content comprising cellulose triacetate and a plasticizer, wherein the dope includes a solvent including a mixed solution of methylene chloride and methanol; and wherein a mixing ratio of the methylene chloride and the methanol ranges from 80:20 to 95:5, while the plasticizer is contained in an amount of 5 to 20 wt. %, relative to 100 wt. % of the cellulose triacetate.

3. The method of claim 2, wherein, if the gel type film stripped off from the wide casting belt has a width of CW and the film obtained from the stretching process has a width of TW, the film has CW≥1300 mm; and CW×0.9≤TW≤CW×1.3.

* * * * *